Nov. 24, 1931.  T. H. THOMAS  1,832,920
VARIABLE LOAD BRAKE
Filed Jan. 19, 1929    2 Sheets-Sheet 1

INVENTOR
THOMAS H. THOMAS
BY Wm. M. Cody
ATTORNEY

Nov. 24, 1931.  T. H. THOMAS  1,832,920
VARIABLE LOAD BRAKE
Filed Jan. 19, 1929   2 Sheets-Sheet 2

INVENTOR
THOMAS H. THOMAS
BY  Wm. M. Cady
ATTORNEY

Patented Nov. 24, 1931

1,832,920

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

VARIABLE LOAD BRAKE

Application filed January 19, 1929. Serial No. 333,585.

This invention relates to fluid pressure brakes, and more particularly to a fluid pressure brake apparatus for a railway car.

There are cases where it has been found expedient to use the same car both in passenger and freight service such as express cars which may at one time be conveniently hauled in a freight train and at another time in a passenger train. Owing to the many differences in the operating conditions, the fluid pressure brake apparatus for passenger service differs widely in its characteristics from that used on freight cars.

The principal object of my invention is to provide a fluid pressure brake equipment adapted for both freight and passenger train service and having means for automatically cutting in the fluid pressure brake apparatus for freight or passenger train service according to the service in which the car is being operated.

Other objects and advantages will appear in the following more detailed description of the invention.

Figure 1:
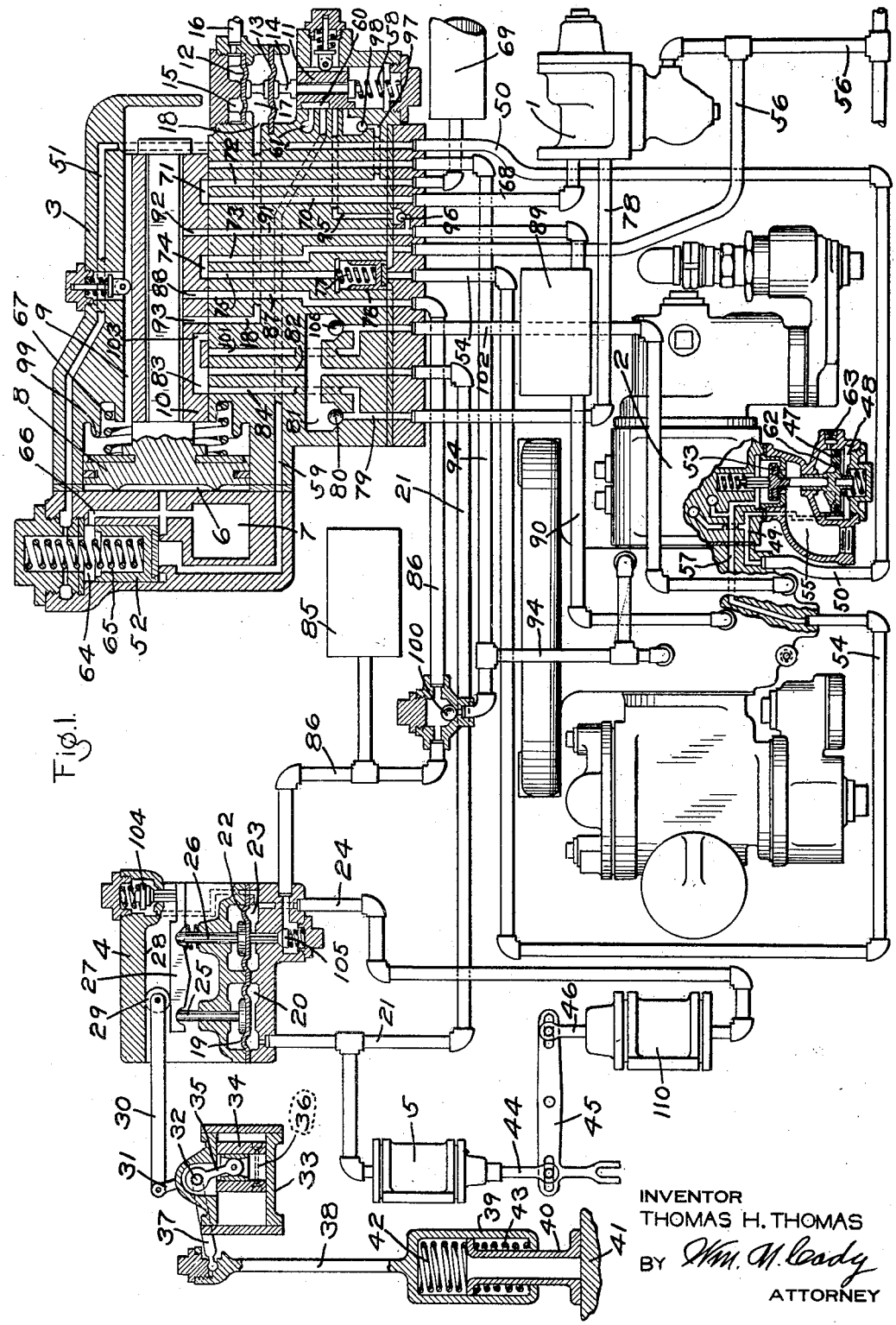
Figure 2:
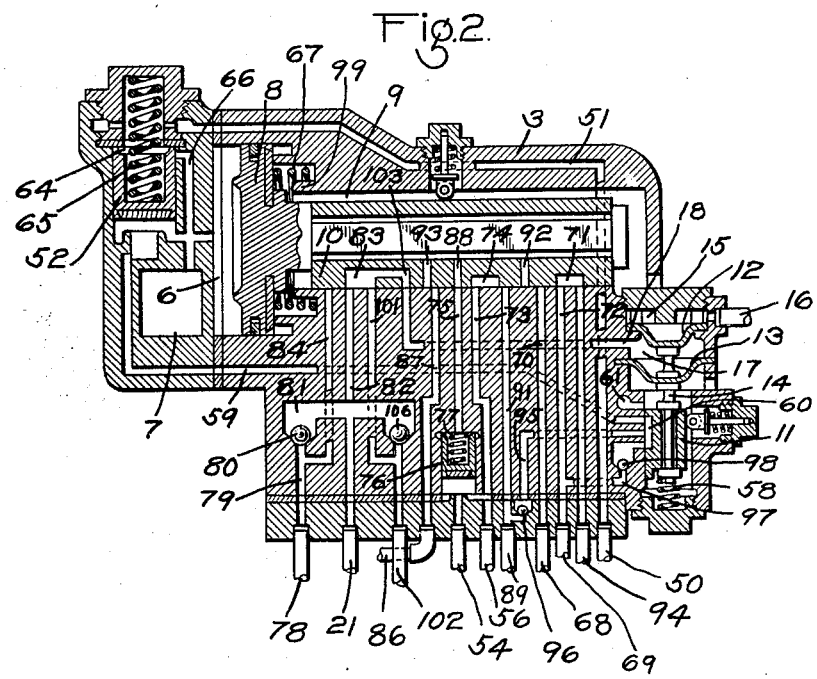

In the accompanying drawings: Figure 1 is a diagrammatic view of a fluid pressure brake equipment embodying my invention and showing the change-over valve device in position for operating in a freight train; and Fig. 2 a sectional view of the change-over valve device in the position for operating in a passenger train.

The equipment may comprise a valve device 1 for controlling the brakes in freight service, such as the well known K triple valve device, a valve device 2 for controlling the brakes in passenger service, such as the well known universal valve device, a change-over valve device 3, and a variable load brake apparatus 4, a brake cylinder 5 for freight service, and a load brake cylinder 110 for passenger service, and used in conjunction with the brake cylinder 5 when the variable load brake apparatus is functioning.

The change-over valve device 3 may comprise a casing having a piston chamber 6 connected to a volume chamber 7 and containing a piston 8 and a valve chamber 9 in free communication with the atmosphere and containing a slide valve 10 adapted to be operated by piston 8.

Associated with the change-over valve device is a slide valve 11 for controlling the fluid pressure on piston 8 and flexible diaphragms 12 and 13, connected to the valve 11 by a stem 14, the diaphragm 13 being of greater area than the diaphragm 12. The chamber 15 at one side of the diaphragm 12 is connected through pipe 16 to the usual train signal pipe when the car is being operated in a passenger train, equipped with a signal system. The chamber 17 intermediate the diaphragms 12 and 13 is connected to a passage 18, leading to the seat of slide valve 10.

The variable load device 4 comprises a casing having a chamber containing a flexible diaphragm 19, the chamber 20 at one side of the diaphragm being connected to a pipe 21, leading to the brake cylinder 5. The casing also has a chamber containing a flexible diaphragm 22, the chamber 23 at one side of the diaphragm being connected through pipe 24 with the brake cylinder 110.

The diaphragms 19 and 22 are provided with stems 25 and 26 respectively, which stems are adapted to engage a fulcrum rod or bar 27. Mounted to engage the face of the bar 27 at one side and a face 28 of casing 4 is a fulcrum roller 29, which is pivotally mounted at the end of a rod 30. The other end of said rod is pivotally connected to a lever 31, which is secured to a shaft 32. Said shaft has bearings in a casing 33, having a chamber containing a dash pot piston 34. A lever arm 35, carried by shaft 32, is operatively connected to said piston and said piston is provided with a restricted passage 36, connecting the chambers at opposite sides of the piston.

A lever arm 37, secured to shaft 32 is pivotally connected to a rod 38, having at its lower end a cage 39. A plunger 40, having one end movable with the car truck member, such as the sand plank 41, extends into the cage 39 and relative movement of said plunger is opposed in opposite directions by springs 42 and 43.

The brake cylinder piston rod 44 is pivotally connected to a lever 45 and brake cylinder push rod 46 of the brake cylinder 110 is also pivotally connected to said lever, the rod 46 being adapted to move relatively to the brake cylinder piston (not shown) in brake cylinder 110 and having a locking device (not shown) of the character disclosed in Patent No. 1,650,309 of U. A. Whitaker, issued November 22, 1927.

It is not deemed necessary to illustrate in detail the valve devices 1 and 2, in order to fully understand the present invention, except that the quick action portion of the valve device is shown in section. The quick action portion comprises a piston 47 having the chamber 48 at one side connected to a passage 49, through which fluid under pressure is supplied by operation of the valve device 2, when an emergency application of the brakes is effected. According to the present invention, a pipe 50 is connected to said passage and said pipe communicates with a passage 51, leading to the chamber at one side of a valve piston 52 of the change-over valve device.

The piston 47 is adapted to operate a vent valve 53 and said valve is adapted to vent fluid from pipe 54 to an atmospheric exhaust passage 55. The pipe 54 is adapted to be connected to the brake pipe 56 when the valve device 2 is cut in for controlling the brakes and said pipe is connected through passage 57 with the usual brake pipe connections of the valve device 2.

In operation, if the apparatus is on a car which is being operated in freight service, the signal pipe will not be connected up, so that there will be no fluid under pressure supplied to pipe 16. The spring 58 will then hold the slide valve 11 and the diaphragms 12 and 13 in the positions shown in Fig. 1, in which passage 59, leading to the inner seated area of valve piston 52 is connected, through cavity 60 in slide valve 11 with an exhaust port 61.

The passage 51 and pipe 50 being connected to piston chamber 48 of the quick action valve device, are normally at atmospheric pressure, since chamber 48 is open, through a restricted port 62 in piston 47 to an atmospheric exhaust port 63. The chamber 64 at the upper side of valve piston 52 is therefore subject to atmospheric pressure and the opposite inner seated area of the valve piston being also at atmospheric pressure, the spring 65 holds the valve piston 52 in the position shown in Fig. 1, in which piston chamber 6 is open through passage 66 to chamber 64. The piston chamber 6 being therefore at atmospheric pressure, the spring 67 maintains the piston 8 and slide valve 9 in the position shown in Fig. 1.

In this position of the change-over valve device, the usual auxiliary reservoir pipe 68 of the triple valve device 1 is connected to the auxiliary reservoir 69 through passage 70, cavity 71 in slide valve 10 and passage 72.

The brake pipe 56 is connected to passage 73 and said passage is connected through a cavity 74 in slide valve 10 with a passage 75 leading to the upper face of a valve piston 76. Brake pipe pressure and the pressure of spring 77 then hold the valve piston 76 seated, so that the brake pipe 56 is cut off from pipe 54, leading to the valve device 2 and consequently, in this position of the change-over valve device, the brake controlling valve device is cut out of action.

Pipe 78, through which fluid under pressure is supplied to the brake cylinder, by operation of the valve device 1, is connected to passage 79 and said passage is connected, past check valve 80 with a chamber 81, which is in communication with brake cylinder pipe 21. Chamber 81 is also connected to passage 82, which passage is connected, through cavity 83 in slide valve 10 with a passage 84, which communicates with passage 79 below the check valve 80.

A load reservoir 85 is connected to pipe 86 and said pipe is connected to a passage 87, which, in the freight service position of slide valve 10, is connected through port 88 with valve chamber 9 and the atmosphere. An emergency reservoir 89, which is connected by pipe 90 to the valve device 2, is also open to valve chamber 9 and the atmosphere, through passage 91 and port 92. Chamber 17 between diaphragms 12 and 13 is also connected to valve chamber 9 and the atmosphere, through passage 18 and port 93.

The load reservoir 85 being at atmospheric pressure, and the auxiliary reservoir pipe 94 of the valve device 2 not being supplied with fluid under pressure, the load valve device 4 is ineffective to supply fluid under pressure to the load brake cylinder 110, when the brakes are applied, so long as the change-over valve device 3 remains in the freight service position as above described.

The auxiliary reservoir 69 being connected to pipe 68, the triple valve device 1 operates in the usual manner to charge the auxiliary reservoir with fluid under pressure, when fluid under pressure is supplied to the brake pipe 56.

Upon reducing the brake pipe pressure to effect an application of the brakes, the triple valve device 1 operates in the usual manner to supply fluid under pressure from the auxiliary reservoir 69 to pipe 78, and thence to chamber 81 and pipe 21. From pipe 21, fluid under pressure is then supplied to the brake cylinder 5 so as to effect an application of the brakes. The brakes may be released in the usual manner, by effecting an increase in brake pipe pressure, whereupon the triple valve device 1 operates to connect pipe 78 with the usual brake cylinder exhaust, so that fluid under pressure is released from the brake cylinder 5.

If a car equipped with the improved brake equipment be shifted from freight to passenger service, the signal pipe of the passenger train will be charged with fluid under pressure, and the pipe 16, being connected to the signal pipe, is also charged with fluid under pressure. The charging of chamber 15 with fluid under pressure from pipe 16 causes the diaphragm 12 to be shifted downwardly, so that the slide valve 11 is shifted to a position in which passage 59 is cut off from exhaust port 61 and is connected through cavity 60 with a passage 95 which leads past a check valve 96 to the emergency reservoir 89, and cavity 60 also registers with a passage 97, which leads past a check valve 98 to the auxiliary reservoir passage 72.

While in the freight service position of the change-over valve device, the auxiliary reservoir 69 having been charged with fluid under pressure, fluid under pressure is now supplied from the auxiliary reservoir to the exposed area of valve piston 52, through passage 97, cavity 60, and passage 59, and the valve piston is then lifted from its seat against the pressure of spring 65 and moves to its upper seat. Fluid under pressure now flows to piston chamber 6 and the volume chamber 7 and when the fluid pressure in piston chamber 6 has been increased to a degree slightly exceeding the pressure of spring 67, the piston 8 is shifted to the right, so that the piston seats on the seat rib 99.

In this position, the slide valve 10 is positioned so that cavity 71 connects passage 72 with the passage leading to pipe 94 and passage 75 is connected to port 88. The passage 75 being thus connected to valve chamber 9 and the atmosphere, the upper side of valve piston 76 is vented to the atmosphere, so that the brake pipe pressure, acting on the outer seated lower area of the valve piston, shifts the valve piston to its upper seat. Communication is thus established from the brake pipe 56 to pipe 54, so that the brake controlling valve device 2 is supplied with fluid under pressure from the brake pipe.

The auxiliary reservoir 69 is then maintained charged with fluid under pressure from the brake pipe through the valve device 2. Fluid under pressure flows from pipe 94, past the check valve 100, to pipe 86 and charges the load reservoir 85.

Cavity 83 in slide valve 10 connects passage 82 with passage 101. The pipe 102, through which the brake controlling valve device 2 supplies fluid under pressure to the brake cylinder is thus connected to chamber 81 and pipe 21. An extended port 103 of the cavity 83 also registers with passage 18, so that diaphragm chamber 17 is supplied with fluid under pressure when fluid is supplied to the brake cylinder. The passages 70 and 84 are blanked by the slide valve 10, so that the valve device 1 is rendered inoperative to control the brakes.

If the brake pipe pressure is reduced to effect an application of the brakes, the valve device 2 is operated to supply fluid under pressure to the pipe 102 and fluid under pressure then flows from chamber 81 to pipe 21 and thence to the brake cylinder 5.

The fulcrum roller 29 of the variable load brake device is adjusted to a position corresponding with the load on the car, by the movement of the rod 38, so that when fluid under pressure is supplied to the brake cylinder 5, and the diaphragm chamber 20, the pressure in said chamber tends to move the diaphragm 19 and the stem 25 upwardly with a force corresponding with the degree of pressure of fluid supplied to the brake cylinder 5, and the member 27 is thereby rocked, with the roller 29 acting as a fulcrum, so as to first permit the valve 104 to seat and then operate the stem 26 so as to unseat the valve 105.

Fluid under pressure is then supplied from the load reservoir 85 and the auxiliary reservoir 69, through pipe 86 and past the open valve 105 to pipe 24 and thence to the brake cylinder 110. The pressure of fluid in the brake cylinder 110 is then transmitted through piston rod 46 to lever 45, so as to augment the pressure with which the brakes are applied.

When the pressure of fluid in the diaphragm chamber 23 and in the brake cylinder 110 has been increased to a degree sufficient to overcome the opposing pressure in diaphragm chamber 20, and dependent upon the position of the fulcrum roller 29 and the pressure of fluid in chamber 20, the stem 26 operates to move the member 27 so as to permit the valve 105 to seat and cut off the further flow of fluid to the load brake cylinder 110.

When the brake pipe pressure is increased to effect the release of the brakes, fluid under pressure is released from the brake cylinder 5 by way of pipe 21 and the brake cylinder exhaust controlled by the valve device 2, and the fluid pressure in diaphragm chamber 20 being correspondingly reduced, the fluid pressure in diaphragm chamber 23 and the brake cylinder 110 operates the diaphragm 22, so that the member 27 is shifted to open the valve 104 and thus permit the release of fluid under pressure from the brake cylinder 110.

If the signal pipe should burst or should the fluid pressure in pipe 16 and in the diaphragm chamber 15 be sufficiently reduced in any other manner, the diaphragms 12 and 13 will move upwardly and cause the valve 11 to connect the passage 59 with exhaust port 61. Fluid under pressure is then vented from the valve piston 52, so that the spring 65 shifts the valve piston to its lower seat. The piston chamber 6 and the charged volume chamber 7 are then connected to passage 51 and fluid under pressure is supplied from the volume chamber 7 through pipe 50 to the under side of the quick action piston 47. The quick action piston is then shifted so as to open the brake pipe vent valve 53 and thus cause fluid under pressure to be vented from the brake pipe 56. An emergency application of the brakes is thus caused and the engineer is made aware that something is wrong with the apparatus. The volume of the chamber 7 and the rate of reduction in fluid pressure by escape through the restricted port 62 in the quick action piston 47 is such that a predetermined time interval ensues before the pressure in the piston chamber 6 is sufficiently reduced to permit the spring 67 to shift the piston 8 to its freight service position, which time interval is sufficient to permit the diaphragm chamber 17 to be charged with fluid under pressure from the brake cylinder as supplied to the brake cylinder in effecting the application of the brakes. With the chamber 17 charged with fluid under pressure, the diaphragms are again shifted downwardly, although there is no fluid pressure in the signal pipe and in the diaphragm chamber 15.

The valve 11 being shifted to its lower position, the passage 59 is again connected to passage 97, so that fluid under pressure is supplied to the valve piston 52, which is again shifted to its upper seat, so that fluid under pressure is supplied to the piston chamber 6, to maintain the piston 8 in its passenger service position.

The change-over valve device will therefore remain in its passenger service position so long as the brakes remain applied. This ensures that in case of a burst signal hose, the change-over valve device will not be shifted to its freight service position, without the knowledge of the engineer and therefore prevents the possibility of the engineer applying the brakes and not obtaining the high braking power of the passenger service setting, due to the change-over valve device having shifted to the freight service position, without the engineer being aware of the fact.

In order to release the brakes, the brake equipment remaining in passenger service with the signal pipe charged with fluid under pressure, the brake pipe pressure is increased in the usual manner and fluid is then released from the brake cylinder by operation of the brake controlling valve device 2.

If, however, a car equipped with the improved apparatus be shifted from passenger service to freight service, the usual auxiliary reservoir release valve (not shown) is operated to release fluid under pressure from the auxiliary reservoir before the brake pipe pressure is increased and the usual drain valve (not shown) of the emergency reservoir is also opened to release fluid from the emergency reservoir. It may be stated that in changing from passenger to freight service, this would be necessary, in any event, since the standard brake pipe pressure used in passenger service is higher than that used in freight service, so that the auxiliary reservoir and the emergency reservoir are charged at a correspondingly higher pressure in passenger service and consequently, the brakes could not be released with the lower pressure used in freight service, without first reducing the auxiliary reservoir pressure.

The reduction in pressure in the emergency reservoir, causes the pressure on the valve piston 52 to be reduced, so that said valve piston will move downwardly to its lower seat. The fluid under pressure in chamber 7 and in the piston chamber 6 is then supplied through passage 51 to the quick action piston 47. The quick action piston operates to open the vent valve 53, but since there is now no fluid pressure in the brake pipe, no venting takes place. The pressure in chamber 7 and in piston chamber 6 then reduces by flow through the port 62 in the piston 47, until the pressure of spring 67 is sufficient to shift the piston 8 to its freight service position.

After this shifting of the change-over valve and piston to the freight service position, the brake pipe may be charged with fluid under pressure which shifts the parts of the brake controlling valve device 1, to release position, if not already in this position, and fluid under pressure in the brake cylinder is then released.

The movement of the slide valve 10 to the freight service position, causes the passage 18 to be connected to port 93, so that diaphragm chamber 17 is vented to the atmosphere, but the signal pipe having been again charged with fluid under pressure, the diaphragms 12 and 13 and the valve 11 are shifted to their lower position by pressure supplied to chamber 15, in which position, fluid under pressure is supplied to the lower side of the valve piston 52. The valve piston 52 is then shifted to its upper seat, so that fluid under pressure is again supplied from passage 59 to chamber 7 and piston chamber 6. Piston 8 and slide valve 10 are then shifted to the passenger service position.

In the freight service position of the slide valve 10, the emergency reservoir 89 is connected to the atmosphere through port 92, so that any possible leakage of fluid from the brake pipe past the valve piston 76 will not charge the emergency reservoir or any of the parts of the valve device 2.

A by-pass passage having a check valve 106 provides an additional passage through which fluid under pressure can flow from pipe 102 to chamber 81 and the brake cylinder, so that the large flow of fluid which occurs when an emergency application of the brakes is effected will be provided for without the necessity for having large port areas in the slide valve 10. If the ports in the slide valve 10 were made of sufficient size to take care of the emergency flow of fluid, the valve would have to be made of excessive size. The by-pass passage containing the check valve 80 provides, in a similar manner for the large flow of fluid in an emergency application, when the change-over valve device is in its freight service position.

With the change-over valve device in passenger service position, the emergency reservoir 89 is connected to the piston chamber 6 to ensure that the fluid pressure in said piston will be maintained. If only the auxiliary reservoir were employed, then when the auxiliary reservoir pressure is reduced to effect an application of the brakes, the fluid pressure in piston chamber 6 and in the volume chamber 7 might leak off sufficiently to permit the valve piston 52 to move to its lower seat when not intended.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake equipment, the combination on a car with a brake cylinder and two valve devices, each operable to supply fluid under pressure to the brake cylinder, of means for automatically rendering one device ineffective to supply fluid to the brake cylinder when the other device is effective to supply fluid to the brake cylinder.

2. In a fluid pressure brake equipment, the combination with a brake pipe, a brake cylinder, and two valve devices, each operable upon a reduction in brake pipe pressure to supply fluid under pressure to the brake cylinder, of means for preventing the operation of one device to supply fluid to the brake cylinder while the other device is operative to supply fluid to the brake cylinder.

3. In a fluid pressure brake equipment, the combination with two valve devices, one adapted to control the brakes in one class of service and the other in another class of service, of means controlled by an operating characteristic of either class of service for rendering one device operative and the other device inoperative to control the brakes.

4. In a fluid pressure brake equipment, the combination with two valve devices, each operative to control the brakes, one device being adapted to control the brakes in one class of service employing a signal pipe normally charged with fluid under pressure and the other in another class of service not employing a signal pipe, of means operated by fluid under pressure from the signal pipe for rendering one device inoperative and the other device operative to control the brakes.

5. In a fluid pressure brake equipment, the combination with two valve devices, each operative to control the brakes, one device being adapted to control the brakes in one class of service employing a signal pipe normally charged with fluid under pressure and the other in another class of service not employing a signal pipe, of means for rendering either device inoperative and the other device operative to control the brakes according to the presence or absence of fluid under pressure in the signal pipe.

6. In a fluid pressure brake equipment, the combination with a brake cylinder and two valve devices, each operative to supply fluid under pressure to the brake cylinder, of means having one position for cutting off communication through which one device supplies fluid under pressure to the brake cylinder and for establishing communication through which the other device supplies fluid to the brake cylinder and another position in which the first mentioned communication is established and the second mentioned communication is cut off and a device operated by fluid under pressure for controlling the operation of said means.

7. In a fluid pressure brake equipment, the combination with a brake cylinder and two valve devices, each operative to supply fluid under pressure to the brake cylinder, of a change-over valve mechanism adapted to establish communication for supplying fluid under pressure from either one of said valve devices to the brake cylinder and for cutting off such communication from the other one of said devices to the brake cylinder, and means operated by fluid under pressure for controlling the operation of said change-over valve mechanism.

8. In a fluid pressure brake equipment, the combination with a brake cylinder, an auxiliary reservoir, a brake pipe, and two brake controlling valve devices each operable upon a reduction in brake pipe pressure for supplying fluid under pressure from the auxiliary reservoir to the brake cylinder, of means having one position for operatively connecting the brake pipe and the auxiliary reservoir to one of said devices and another position for operatively connecting the brake pipe and auxiliary reservoir to the other one of said devices.

9. In a fluid pressure brake equipment, the combination with a brake cylinder, an auxiliary reservoir, a brake pipe, and two brake controlling valve devices each operable upon a reduction in brake pipe pressure for supplying fluid under pressure from the auxiliary reservoir to the brake cylinder, of valve means operated by variations in fluid under pressure for operatively connecting the auxiliary reservoir and the brake pipe to one of said devices while the other device is cut off from the brake pipe and auxiliary reservoir, and means operated by variations in fluid under pressure for varying the fluid pressure on said valve means.

10. In a fluid pressure brake equipment, the combination on a car with a brake controlling device for controlling the brakes in one class of service and another brake controlling valve device for controlling the brakes in another class of service, of valve means operable to render one of said devices inoperative to control the brakes when the other device is operative to control the brakes, and means for effecting an application of the brakes upon the shifting of control of the brakes from one brake controlling valve device to the other.

11. In a fluid pressure brake equipment, the combination on a car with a brake controlling valve device for controlling the brakes in passenger service and another brake controlling valve device for controlling the brakes in freight service, of means for operatively connecting up one or the other of said devices to control the brakes, and means for effecting an application of the brakes upon shifting the control from the passenger brake controlling valve device to the freight brake controlling valve device.

12. In a fluid pressure brake equipment, the combination with a brake controlling valve device for controlling the brakes in passenger service and another brake controlling valve device for controlling the brakes in freight service, of means operated by fluid pressure in the signal pipe in passenger service for operatively connecting up the passenger brake controlling valve device to control the brakes while the freight brake controlling valve device is rendered inoperative and operated upon a reduction in pressure in the signal pipe for operatively connecting up the freight brake controlling valve device to control the brakes while the passenger brake controlling valve device is rendered inoperative, and means for effecting an application of the brakes upon a reduction in pressure in the signal pipe.

13. In a fluid pressure brake equipment, the combination with a brake controlling valve device for controlling the brakes in passenger service and another brake controlling valve device for controlling the brakes in freight service, of means operated by fluid pressure in the signal pipe in passenger service for operatively connecting up the passenger brake controlling valve device to control the brakes while the freight brake controlling valve device is rendered inoperative and operated upon a reduction in pressure in the signal pipe for operatively connecting up the freight brake controlling valve device to control the brakes while the passenger brake controlling valve device is rendered inoperative, and means for effecting an emergency application of the brakes upon a reduction in pressure in the signal pipe.

14. In a fluid pressure brake equipment, the combination with a brake cylinder and two brake controlling valve devices for controlling the supply of fluid under pressure to the brake cylinder, of a valve for controlling communication from each valve device to the brake cylinder, and a by-pass passage providing an always open communication from each valve device to the brake cylinder.

15. In a fluid pressure brake equipment, the combination with a brake cylinder and two brake controlling valve devices for controlling the supply of fluid under pressure to the brake cylinder, of a valve for controlling communication from each valve device to the brake cylinder, passages providing an always open communication from each valve device to the brake cylinder, and a non-return check valve in each passage.

16. In a fluid pressure brake equipment, the combination with two brake controlling valve devices for controlling the brakes in different classes of service and a brake cylinder to which said valve devices are adapted to supply fluid under pressure, of valve means operated by variations in fluid under pressure for operatively connecting one valve device to control the pressure in the brake cylinder while the other device is rendered inoperative, and a controlling valve device operated by fluid under pressure supplied thereto under a certain condition for varying the fluid pressure on said valve means, said controlling valve device being also operated by fluid under pressure supplied from the brake cylinder.

17. In a fluid pressure brake equipment, the combination with two brake controlling valve devices and a brake cylinder, of a change-over valve for controlling communication through which each valve device supplies fluid under pressure to the brake cylinder, a piston operated by variations in fluid under pressure for operating said valve, a controlling valve for controlling variations in fluid pressure on said piston, and movable abutments for operating said controlling valve, said abutments being controlled by fluid under pressure from the brake cylinder and also from another source.

18. In a fluid pressure brake equipment, the combination with a brake pipe and a valve device operated upon an increase in fluid under pressure for venting fluid from the brake pipe, of valve means operated upon a reduction in fluid pressure for supplying fluid under pressure to said valve device, and a controlling valve mechanism subject to the pressure of fluid in a train signal pipe and operated upon a reduction in pressure in the train signal pipe for venting fluid under pressure from said valve means.

19. In a fluid pressure brake equipment, the combination with two brake controlling valve devices, of valve means having one position in which one of said devices is operative to control the brakes and the other device is inoperative to control the brakes and another position in which the device which is operative in the first position is rendered inoperative and the other device is rendered operative to control the brakes, a valve device operated by fluid under pressure in a train signal pipe for maintaining said valve means in one of its positions, and means for preventing movement of said valve means to its other position upon a reduction in fluid pressure in the signal pipe.

20. In a fluid pressure brake equipment, the combination with an auxiliary reservoir, a brake cylinder, and two brake controlling valve devices, each operative to supply fluid under pressure from the auxiliary reservoir to the brake cylinder, of a valve means operated by variations in fluid pressure for rendering one of said valve devices operative to supply fluid to the brake cylinder while the other valve device is rendered inoperative, and a valve mechanism operated by fluid under pressure for controlling the supply of fluid under pressure from the auxiliary reservoir to said valve means.

21. In a fluid pressure brake equipment, the combination with an auxiliary reservoir, a brake cylinder, and two brake controlling valve devices, each operative to supply fluid under pressure from the auxiliary reservoir to the brake cylinder, of a valve means operated by variations in fluid pressure for rendering one of said valve devices operative to supply fluid to the brake cylinder while the other valve device is rendered inoperative, an emergency reservoir, and a valve mechanism operated by fluid under pressure for controlling the supply of fluid under pressure from the emergency reservoir to said valve means.

22. In a fluid pressure brake equipment, the combination with an auxiliary reservoir, a brake cylinder, and two brake controlling valve devices, each operative to supply fluid under pressure from the auxiliary reservoir to the brake cylinder, of a valve means operated by variations in fluid pressure for rendering one of said valve devices operative to supply fluid to the brake cylinder while the other valve device is rendered inoperative, an emergency reservoir, and a valve mechanism operated by fluid under pressure for controlling the supply of fluid under pressure from the emergency reservoir and from the auxiliary reservoir to said valve means.

In testimony whereof I have hereunto set my hand, this 18th day of January, 1929.

THOMAS H. THOMAS.